US011712843B2

(12) United States Patent
Bromberg et al.

(10) Patent No.: US 11,712,843 B2
(45) Date of Patent: Aug. 1, 2023

(54) BINDER JETTING APPARATUS AND METHODS

(71) Applicant: General Electric Company, Schenectady, NY (US)

(72) Inventors: Vadim Bromberg, Niskayuna, NY (US); Victor Wayne Fulton, Amelia, OH (US); Carlos H. Bonilla, West Chester, OH (US); Travis Gene Sands, Lebanon, OH (US); Brian Harlow Farrell, Niskayuna, NY (US); Joseph Lucian Smolenski, Singerlands, NY (US); Younkoo Jeong, Clifton Park, NY (US); Glen Charles Fedyk, Fairfield Township, OH (US)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 16/770,742

(22) PCT Filed: Dec. 7, 2018

(86) PCT No.: PCT/US2018/064409
§ 371 (c)(1),
(2) Date: Jun. 8, 2020

(87) PCT Pub. No.: WO2019/113412
PCT Pub. Date: Jun. 13, 2019

(65) Prior Publication Data
US 2021/0170680 A1 Jun. 10, 2021

Related U.S. Application Data

(60) Provisional application No. 62/595,833, filed on Dec. 7, 2017.

(51) Int. Cl.
*B29C 64/165* (2017.01)
*B29C 64/218* (2017.01)
(Continued)

(52) U.S. Cl.
CPC ............ *B29C 64/165* (2017.08); *B22F 10/14* (2021.01); *B22F 12/63* (2021.01); *B29C 64/153* (2017.08);
(Continued)

(58) Field of Classification Search
CPC ..... B29C 64/20; B29C 64/165; B29C 64/227; B29C 64/236; B29C 64/205;
(Continued)

(56) References Cited

U.S. PATENT DOCUMENTS

2002/0105114 A1* 8/2002 Kubo ................... B29C 64/153
425/375
2004/0084814 A1* 5/2004 Boyd ..................... B33Y 40/00
264/109
(Continued)

FOREIGN PATENT DOCUMENTS

EP          3219410 A1    9/2017
WO    WO2015/106838 A1   7/2015
WO    WO-2016119898 A1 * 8/2016  ........... B29C 64/165

OTHER PUBLICATIONS

PCT International Search Report Corresponding to PCT/US2018/064409 dated Mar. 19, 2019.

*Primary Examiner* — Seyed Masoud Malekzadeh
*Assistant Examiner* — Jennifer L Groux
(74) *Attorney, Agent, or Firm* — Dority & Manning, P.A.

(57) ABSTRACT

A binder jet printing apparatus (10), along with methods of its use, is provided. The binder jet printing apparatus (10) may include: a job box (18) having a actuatable build plate (46) therein; a supply box (54) having a bottom platform
(Continued)

(56) that is actuatable within the supply box (54); a print system including at least one print head (32) connected to a binder source (38) and configured to apply a pattern of binder onto an exposed powder layer (42) over the build plate (46) of the job box (18); a recoat system (16) including a recoater configured to move from the supply box (54) to the job box (18) to transfer powder from the supply box (54) to the job box (18) so as to form a new powder layer (48) over the build plate (46) of the job box (18); and a cure system (14) configured to direct electromagnetic radiation onto the job box (18).

18 Claims, 6 Drawing Sheets

(51) Int. Cl.
| | | |
|---|---|---|
| *B22F 10/14* | (2021.01) | |
| *B22F 12/63* | (2021.01) | |
| *B33Y 30/00* | (2015.01) | |
| *B22F 12/10* | (2021.01) | |
| *B22F 12/00* | (2021.01) | |
| *B22F 12/41* | (2021.01) | |
| *B22F 12/90* | (2021.01) | |
| *B29C 64/153* | (2017.01) | |
| *B33Y 10/00* | (2015.01) | |
| *B22F 10/68* | (2021.01) | |
| *B22F 10/73* | (2021.01) | |
| *B22F 12/20* | (2021.01) | |
| *B22F 10/36* | (2021.01) | |
| *B22F 10/60* | (2021.01) | |

(52) U.S. Cl.
CPC ............ *B29C 64/218* (2017.08); *B22F 10/36* (2021.01); *B22F 10/60* (2021.01); *B22F 10/68* (2021.01); *B22F 10/73* (2021.01); *B22F 12/10* (2021.01); *B22F 12/20* (2021.01); *B22F 12/224* (2021.01); *B22F 12/41* (2021.01); *B22F 12/90* (2021.01); *B33Y 10/00* (2014.12); *B33Y 30/00* (2014.12)

(58) Field of Classification Search
CPC ... B29C 64/218; B29C 64/232; B29C 64/209; B29C 64/214; B29C 64/264; B29C 64/295; B29C 64/153; B22F 12/00; B22F 10/10; B22F 10/14; B22F 12/22; B22F 12/224; B22F 12/60; B22F 12/63; B22F 10/20; B22F 10/28; B33Y 30/00
See application file for complete search history.

(56) References Cited

U.S. PATENT DOCUMENTS

| | | | |
|---|---|---|---|
| 2008/0241404 A1* | 10/2008 | Allaman | B29C 64/357 118/308 |
| 2015/0273766 A1* | 10/2015 | Denda | B29C 64/165 264/483 |
| 2016/0243619 A1* | 8/2016 | Gothait | B28B 1/001 |
| 2016/0368054 A1* | 12/2016 | Ng | B22F 12/67 |
| 2017/0210065 A1* | 7/2017 | Kanda | B29C 64/209 |
| 2017/0259456 A1 | 9/2017 | Sasaki et al. | |
| 2017/0297109 A1 | 10/2017 | Gibson et al. | |
| 2018/0022021 A1* | 1/2018 | Nagahari | B29C 64/112 264/308 |
| 2018/0036947 A1 | 2/2018 | Chanclon et al. | |
| 2018/0215079 A1* | 8/2018 | Hakkaku | B33Y 30/00 |
| 2019/0039303 A1* | 2/2019 | Barnes | B29C 64/227 |
| 2021/0206057 A1* | 7/2021 | Schalk | B33Y 30/00 |

\* cited by examiner

BINDER JETTING APPARATUS AND METHODS

PRIORITY INFORMATION

The present application claims priority to U.S. Provisional Patent Application Ser. No. 62/595,833 titled "Binder Jetting Apparatus and Methods" filed on Dec. 7, 2017, the disclosure of which is incorporated by reference herein.

FIELD

The present disclosure generally relates to methods and systems adapted to perform additive manufacturing ("AM") processes, for example by binder jet printing. In particular, apparatus and methods are described for three-dimensional (3D) binder jet printing for making printed articles from powder.

BACKGROUND

Additive manufacturing ("AM") processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Another form of additive manufacturing involves the use of a binder to join the powder particles together, followed by subsequent sintering following the build process. The term "binder jetting" or "binder jet printing" describes a form of additive manufacturing that utilizes a printer to form three-dimensional objects from a powder by selectively applying a binder liquid to incremental layers of the powder. The binder binds layers of the powder into solid two-dimensional cross sections of the desired object, as well as binding layers to each other in the vertical direction. After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

There is an ongoing need to increase the operational speed of the AM apparatus, such that the throughput of the apparatus may be increased and the cost of each part may be reduced. Additionally, there is an ongoing need to improve the quality of the part built by the AM process.

BRIEF DESCRIPTION

Aspects and advantages will be set forth in part in the following description, or may be obvious from the description, or may be learned through practice of the invention.

A binder jet printing apparatus is generally provided, along with methods of its use. In one embodiment, the binder jet printing apparatus includes: a job box having a actuatable build plate therein; a supply box having a bottom platform that is actuatable within the supply box; a print system including at least one print head connected to a binder source and configured to apply a pattern of binder onto an exposed powder layer over the build plate of the job box; a recoat system including a recoater configured to move from the supply box to the job box to transfer powder from the supply box to the job box so as to form a new powder layer over the build plate of the job box; and a cure system configured to direct electromagnetic radiation onto the job box.

In one embodiment, the build plate within the job box and the bottom platform within the supply box are actuatable in a shared relationship. For example, the job box and the supply box may have a substantially equal size in their respective x-y plane to have an equal volume per unit of depth in their respective z-direction. As such, when the bottom platform raises in the z-direction within the supply box for a first distance that is equal to or greater than a second distance that the build platform lowers within the job box, it is ensured that sufficient or excess powder is available to form a new powder layer over the job box. The print system may be configured to move over the job box independently of the movement of the cure system and the recoat system.

The cure system and the recoat system may be ganged together so as to move together. For example, the cure system and the recoat system may be positioned relative to each other such that, when passing from the supply box to the job box, the recoat system trails the cure system such that the binder on an exposed powder layer over the job box is cured prior to transfer of the new layer from the supply box to the job box.

The recoat system may include, in certain embodiments, a roller rotatable about an axis in a rotational direction that is counter-rotating to the direction of movement of the cure system from the supply box to the job box. For example, a controller may be included that is in communication with the roller and configured to regulate the rotational speed of the roller. In one embodiment, the roller is composed of a stainless steel with an external coating thereon that is configured to increase the hardness of the roller. The binder jet printing apparatus may also include a shield partially encasing the roller therein to help powder containment.

A drain system, an inner wall, and/or a cleaning system may also be included within the apparatus. The drain system may include a drain positioned along at least one side of the job box to collect excess powder from the job box. The inner wall may extend in the machine direction and may be positioned so as so separate the print system from the cure system and the recoat system. The cleaning system positioned such that a print head of the print system is cleaned simultaneously while the cure system and the recoat system are over the supply box and job box.

The process is also provided for binder jet printing to form a green component. In one embodiment, the process includes: printing a binder material onto a first layer of powder, which is positioned over a build plate within a job box, according to a specified design; curing the binder printed onto the first layer of powder; transferring powder from a supply box to the job box using a roller to form a second layer of powder over the first layer on the build plate; and repeating the printing, curing, transferring, and transferring to form the green component from multiple layers of powder cured together with the binder material. The roller moves in a machine direction from the supply box to the job box and rotates about an axis in a rotational direction that is counter-rotating to the direction of movement from the supply box to the job box.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 6b shows a side view of the exemplary cleaning system of FIG. 6a; and

Repeat use of reference characters/terms in the present specification and drawings is intended to represent the same or analogous features or elements of the present invention.

When describing these drawings, coordinates are shown in the x-direction, the y-direction, and the z-direction. The x-direction may be referred to as the machine direction; the y-direction may be referred to as the cross-machine direction; and the z-direction may be referred to as the vertical direction (i.e., height).

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Apparatus and methods are generally provided for building a part(s) via binder jet printing. In certain embodiments, the apparatus and methods may provide improved throughput by reducing the amount of time required for a build compared to conventional binder jet printing apparatus. During the binder jet printing methods, a thin layer of powder is positioned over a build plate within a job box. A print system is utilized to spray a binder onto a thin layer of powder. A cure system is then used to set the binder (e.g., via curing) to form a layer of bound powder, in the configuration defined by the pattern the computer communicates to the print system for a given layer of an object. After the binder is set, the job box may be indexed down in the z-direction, and a recoat system may apply another thin layer of powder over the original layer. That is, after each layer is printed and cured, the work piece is indexed away from the print head for a sufficient distance to create room for a subsequent layer of powder while leaving the relationship between the print head and the subsequent powder layer, which may be the same as for the previous layer to provide a consistent spacing between the print head and each powder layer during the build. In particular embodiments, each powder layer has a thickness measured in the z-direction over the job box that is about 40 µm to about 75 µm, such as about 50 µm (e.g., 50 µm+/−5 µm).

This process of printing a binder, curing, indexing, and recoating is repeated for the desired number of layers to eventually form the part(s). The powder that was not patterned with the binder remains where it was originally deposited and serves as a foundation for powder/binder sections deposited in areas not previously patterned with binder, and as support for the powder/binder structure. When deposition of the part is complete, the powder not patterned with binder is removed leaving a green part formed from the powder held together by the binder.

Referring to FIGS. 1-4, embodiments of exemplary binder jet printing apparatus and methods are generally shown. Generally, the binder jet printing apparatus 10 of FIGS. 1-4 includes a print system 12, a cure system 14, and a recoat system 16 to build a part 11 layer-by-layer within a job box 18 from a computer model (e.g., a CAD model stored within a control system 20). The part 11 may be a single component (i.e., an individual part) or multiple components (i.e., multiple individual parts). In the embodiments shown, the print system 12, cure system 14, and recoat system 16 are attached to a carry plate 22 that is moveable in the y-direction (i.e., the cross-machine direction), which is controlled by the first movement system 24, over a work table 50. As shown, the first movement system 24 controls the linear movement in the y-direction of the carry plate 22 along the support beams 26 that extend in the y-direction. As shown, the supports 27 attached to the carry plate 22 can move along the support beams 26. Thus, the cross-machine movement in the y-direction of the print system 12, cure system 14, and recoat system 16 is performed together. Generally, the first movement system 24 may include any suitable components for linear movement of the carry plate 22 in the x-direction. For example, any combination of scaffold, gantry, beams, supports, motor, actuator, controls, rollers, positioning mechanism, etc. may be utilized. Likewise, the second movement system 28 and the third movement system 30 discussed below may include any suitable components for linear movement in the y-direction.

A second movement system 28 is attached to the print system 12 to independently control the movement of a print head 32 in the x-direction (i.e., the machine direction). Thus, the print system 12 may independently move in the x-direction across the print area 34 of the job box 18 (i.e., the top portion of the job box).

Generally, the print system 12 includes a print head 32 having one or more print dies 36, each independently controlled and connected to a binder source 38. In use, the first movement system 24 carries the carry plate 22 to a position in the y-direction such that the print head 32 is over at least a portion of the job box 18. While moving in the x-direction, as controlled by the second movement system 28, the print head 32 sprays a binder material 40 onto an exposed layer 42 of powder 44 within the job box 18 to according to the instructions from the control system 20. Depending on the size of the print head 32 and/or the number of print heads 32 in the print system 12, the print system 12 may make a single pass or multiple passes over the job box 18. In one embodiment, the print head 32 has a plurality of independent print dies 36, each configured to spray binder droplets having a drop volume of about 30 picoliters to about 80 picoliters.

After printing of the binder material 40, a build plate 46 may be actuated within the job box 18 such that the build plate 46 moves down in the z-direction to allow for another powder layer to be applied over the build plate 46 within the job box 18. In one embodiment, the distance that the build plate 46 moves in the z-direction is about 90% to 100% (i.e., equal to) the thickness of the powder layer 48 of each build layer to ensure that the powder layer 48 is fully and equally applied over build plate 46 within the job box 18. A first actuation system 47 is associated job box 18 so as to control the movement of the build plate 46 in the z-direction. For example, if the powder layer 48 of each build layer is 100 micrometers (μm), then the build plate 46 of the job box 18 may be lowered away from the work table 50 for a distance of about 90 μm to 100 μm.

In the embodiment shown, the powder 44 is supplied from a supply box 54 that is positioned within the work table 50. An second actuation system 52 is associated with a bottom platform 56 of the supply box 54 so as to control the movement of the bottom platform 56 in the z-direction. As such, the bottom platform 56 may be raised within the supply box such that loose powder 44 provides source powder for the recoat system 16 to create a new powder layer over the job box 18 (i.e., through moving the powder 44 from the supply box 54 to the job box 18). Although shown as independent actuation systems (one for each of the supply box 54 and the job box 18), the actuation may be performed in a shared relationship between the build plate 46 of the job box 18 and the bottom platform 56 of the supply box 54 with any suitable actuation mechanism(s).

In one embodiment, such as where the job box 18 and the supply box 54 have a substantially equal size in the x-y plane (and thus an equal volume per unit of depth in the z-direction) the distance that the bottom platform 56 raises in the z-direction within the supply box 54 is equal to or greater than the distance that the build plate 46 lowers within the job box 18 to ensure that sufficient or excess powder is available to form a new powder layer over the build plate 46 within the job box 18. For example, if the powder layer 42 of each build layer is 100 micrometers (μm), then the bottom platform 56 may be raised within the supply box 54 for a distance of about 100 μm to 150 μm.

During the printing process, the cure system 14 and the recoat system 16 may be idle and/or positioned away from the job box 18 in the apparatus 10. That is, the first movement system 24 moves the carry plate 22 in the y-direction such that the print system 12 is over the job box 18 while the recoat system 16 and the cure system 14 are positioned away from the job box 18 in the y-direction. Such a positioning of the carry plate 22 may be referred to as the first configuration, though it is understood that the carry plate 22 may not be stationary in the y-direction during the entire print process, since multiple passes in the x-direction (controlled by the second movement system 28) along different lines of the y-direction may be utilized to complete the printing process. Collectively, the first configuration refers to any position of the carry plate 22 where the print head 32 is positioned over at least a portion of the job box 18 in the y-direction.

After applying the binder material 40 onto the exposed layer 42 of powder 44 over the build plate 46, the first movement system 24 moves the carry plate 22 to a second configuration, where the print head 32 is over a cleaning system 58 and where the cure system 14 and the recoat system 16 are positioned over the job box 18 in the y-direction. In one particular embodiment, the movement of the carry plate 22 by the first movement system 24 from the first configuration to the second configuration occurs simultaneous with the actuation of the build plate 46 within the job box 18 in the z-direction and of the bottom platform 56 within the supply box 54 in the z-direction.

Once the carry plate 22 is in the second configuration, the cure system 14 and the recoat system 16 may be passed over the job box 18 together in the x-direction, with the cure system 14 passing over the job box 18 first and the recoat system 16 trailing the cure system 14. As such, the binder material 40 in the top, exposed layer 42 of powder 44 may be cured, followed by application of a new layer of powder 44 with the recoat system 16. That is, the excess powder over the supply box 54 above the x-y plane of the top surface 51 of the work table 50 may be transferred to the job box 18 to form a new top layer with any excess powder being carried into the drain system 60 (e.g., for collection and recycling thereof). As shown, a series of drains 62 may be positioned along the sides of the supply box 54 and/or the job box 18 for collection of any excess powder 44 that is spread outside of the side edges 19 of the job box 18 and/or supply box 54. In particular embodiments, the drain system 60 may be connected to a vacuum system 64 for collection of the excess powder 44.

In the embodiment shown, a gang plate 66 carries the cure system 14 and the recoat system 16. A third movement system 30 is attached to the gang plate 66 to control its movement in the x-direction such that the recoat system 16 and the cure system 14 move in unison in the x-direction, but independently in the x-direction from the print system 12. Thus, the recoat system 16 and the cure system 14 may move in the x-direction across the print area 34 of the job box 18 independent of the x-direction movement of the print head 32.

The cure system 14 may generally include a lamp 68 configured to direct electromagnetic radiation (i.e., light waves) onto the print area 34 of the job box 18. In the embodiment shown, the lamp 68 spans the entire job box 18 in the y-direction. As such, the third movement system 30 may move the lamp 68 over the job box 18 in a single pass. During the movement of the lamp 68 over the job box 18, the lamp 68 directs electromagnetic radiation onto the exposed layer 42 of powder such that any binder material 40 present therein may be dried and/or cured. For example, the electromagnetic radiation may have a wavelength and intensity sufficient to evaporate at least a portion of the solvent of the binder material 40 and/or cure non-volatile components (e.g., organic binding materials).

The lamp 68 may direct electromagnetic radiation having a wavelength in the microwave frequency, the infrared frequency, the visible frequency, the ultraviolet frequency, the x-ray frequency, the gamma ray frequency, etc., or combinations thereof. In one particular embodiment, the lamp 68 may direct light in the infrared frequency (e.g., having a wavelength of about 700 nm to about 1 mm), which may have sufficient energy to evaporate solvent from the binder material 40 and/or cure the binding material 40. For example, such an infrared lamp may have a power of about 1000 W to about 2000 W. In one particular embodiment, the intensity of the lamp 68 is modulated by the controller 70 based on real-time temperature measurement of the job box 18. For example, the controller 70 may obtain the temperature of the exposed layer 42 (e.g., using a temperature sensor 72) and determine the intensity of the lamp 68 required for the desired drying and/or curing operation at the particular speed of movement of the cure system 14 in the x-direction. In one embodiment, the controller 70 may utilize a closed loop control parameters that are determined by a computer model of the material system and process, thus alleviating the need for operator controller tuning through multiple iterations of trial and error.

The controller 70 may also actuate the operation of the lamp 68 (i.e., on/off) such that the lamp 68 is directing electromagnetic radiation only when traveling over the exposed layer 42 of the job box 18. However, in particular embodiments, the controller 70 may do a "soft" start on the lamp 68 such that the intensity of the lamp 68 is slowly increased during each start up. Without wishing to be bound by any particular theory, it is believed that a "soft" start may extend the life of the lamp 68 and ensure uniform energy applied across the job box 18 during operation of the cure system 14, both throughout each pass in the x-direction and between passes over subsequent layers of the build process.

The recoat system 16 trails the cure system 14 to transfer powder 44 from the supply box 54 to form a new powder layer 48 over the job box 18. In the embodiment shown, the recoat system 16 includes a roller 74 that is rotatable about an axis 76 in a rotational direction that is counter-rotating (represented by arrow 81) to the direction of x-movement during recoating. As shown, the recoat system 16 is moving right to left in the x-direction, and the roller 74 is rotating in the clockwise direction (i.e. the counter rotating direction). In such an embodiment, the counter rotation of the roller 74 (with respect to the x-movement direction) creates a shear force on the powder layer 48 to force new powder and excess powder in front of the recoat system 16, ensuring sufficient pick-up of the powder 44 from the supply box 54 and uniform application of the powder 44 across the entire x-y plane of the job box 18. Without wishing to be bound by any particular theory, it is believed that the counter rotation of the roller 74 generates shear forces that help overcome cohesive forces within the powder 44 being pushed across the job box 18.

A controller 78 is shown to regulate the rotational direction and/or speed of the roller 74 as it is moved in the x-direction. The controller 78 may be connected to the roller 74 via any rotational mechanism (e.g., a belt drive).

The roller 74 may have a substantially smooth surface 80 across its entire surface, with minimal surface imperfections or linear bending/distortion across the length of the roller 74. For example, the roller 74 may be made from a relatively hard material (e.g., stainless steel). The roller 74 may be a solid roller, or may be a hollow roller with end caps (e.g., to reduce weight of the roller). The roller 74 may also have a temperature regulator device 82 (e.g., a heating device and/or a cooling device) to set a desired roller surface temperature. An external coating 84 may be on the surface 80 of the roller 74 to adjust the surface properties of the roller 74 for contacting the powder layers 48. For instance, the coating 84 may increase the hardness of the surface 80 of the roller 74, and/or reduce the surface energy of the roller 74 so as to reduce the adhesive tendency between the roller surface 80 and the powder 44 (including dry powder and/or binder-infiltrated powder).

Suitable coating materials may include, for example, thin dense chromium coating (e.g., formed of Armoloy® TDC (Armoloy of Western Pa., Inc., Pennsylvania), aluminum infiltrated with polytetrafluoroethylene (e.g., Teflon® (The Chemours Company, Delaware), etc. In one embodiment, the coating 84 may have a thickness (i.e., extending in a radial direction from the axis 76 of the roller 74) of about 0.1 μm to about 1000 μm (e.g., about 1 μm to about 25 μm, such as about 2 μm to about 10 μm).

In one embodiment, after the recoat system 16 completes its first pass over the job box 18, the roller 74 may be traversed back over the applied new powder layer 48 to compress the powder 44 over the job box 18. In such an embodiment, the speed of the traverse pass may be matched to the rotation of the roller 74 such that shear forces on the powder layer 48 is minimized. Without wishing to be bound by any particular theory, the roller 74 may compress the newly applied powder layer 48 to improve the powder layer 48 for subsequent binder application thereon. For instance, it is believed that the traversal of the roller 74 over the job box 18 during this second pass allows the roller 74 to generate normal forces that both push the powder 44 forward as well as down into the region between the roller 74 and the surface of the previously exposed layer 42.

The rotation speed and x-direction movement speed may vary depending on the size of the supply box 54 and the job box 18, the size of the roller 74 (e.g., the diameter), the material of the powder 44, etc. In one embodiment, the rotational speed of the roller 74 may be about 100 rotations/minute (RPM) to about 1000 RPM in the counter rotational direction, while the speed of the roller 74 in the x-direction is about 25 mm/s to about 300 mm/s across the job box 18 in the x-direction.

Optionally, a shield 86 may be utilized in conjunction with the roller 74 to partially encase the roller 74 therein and to help powder containment within the build area (e.g., between the drains 62). Also optionally, a vacuum manifold 88 may be positioned in close proximity to the roller 74 to pick up aerosolized powder particles 44 during the recoating process. Such a vacuum manifold 88 and/or shield 86 may be particularly useful when spreading a powder 44 having relatively small particle sizes. In particular embodiments, such a vacuum manifold 88 may form part of an internal environmental monitoring or control system.

While the carry plate 22 is in the second configuration, the print head 32 is positioned over a cleaning system 58. The cleaning system 58 may remove any excess binder and/or powder that has attached onto the print head 32, and particularly the print die(s) 36 within the print head 32. In one particular embodiment, the print head 32 is cleaned simultaneously while the cure system 14 and recoat system 16 are operating over the job box 18. In such an embodiment, the spacing between the cleaning system 58 and the job box 18 in the y-direction is substantially the same as the spacing between the print system 12 and the cure system/recoat system (14/16) on the carry plate 22. In a preferred embodiment, the print system 12 and cure/recoat systems (14/16) are mechanically separated (e.g., by an inner wall 90) in order to confine heat & powder from contaminating the cleaning system 58 as well as stray binder/cleaner from entering the supply box 54 and/or job box 18. As shown, the inner wall 90 extends in the x-direction and is positioned so as to separate the print system (on one side of the inner wall 90) from the cure system and the recoat system (on the opposite side of the inner wall 90).

Figure 6A:
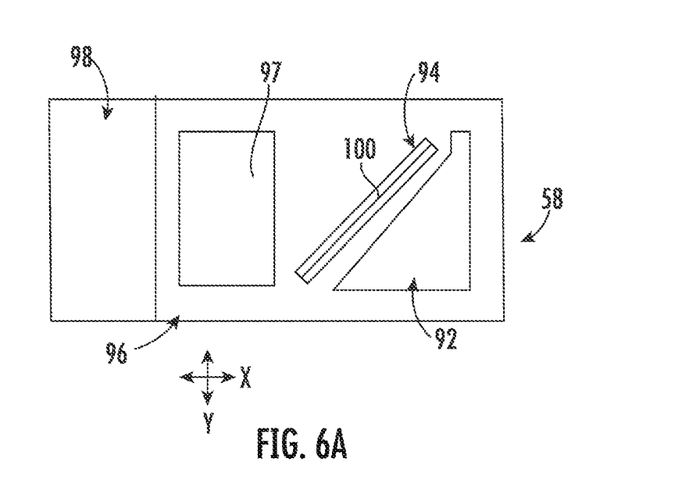
FIG. 6a shows a top view of an exemplary cleaning system for use with a binder jet printing apparatus such as in FIGS. 1-4.
Figure 6B:
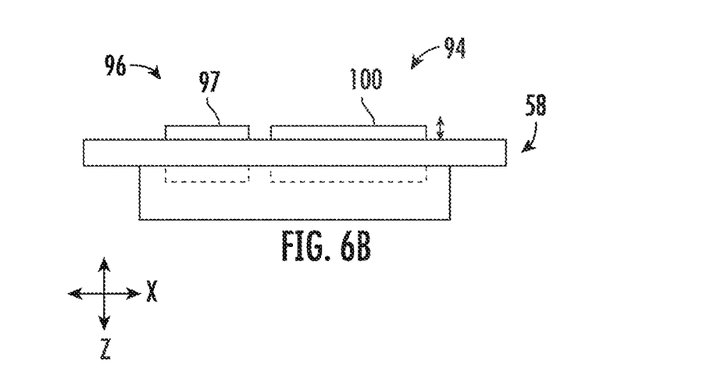

FIGS. 6A and 6B show various view of an exemplary embodiment of the cleaning system 58, which may include one or more of a waste purge area 92, a wiping station 94, a sponge station 96, and a pattern test station 98. Wiping stage(s) may be performed by moving the print head 32 in the x-direction over the wiper station 94 such that the die(s) 36 of the print head 32 contact a wiper 100 within the wiping station 94. In one embodiment, the wiper 100 may be actuated in the z-direction within the wiper station 94 such that the wiper 100 is wet with a cleaning solution through at least one pass of the print head 32 (e.g., the first pass of the print head 32 over the wiper 100). Thus, the wet pass may ensure that the print die(s) 36 of the print head 32 contact the cleaning solution during the cleaning process. The print head 32 may also pass over the wiper 100 again, without re-wetting the wiper, such that the print head 32 makes a dry pass to remove loose material and/or residual cleaning solution thereon. Before and/or after the wiping stages, the print head 32 may be moved in the x-direction over the waste purge area 92. There, the print head 32 may be activated to spray binder material 40 out of the print die(s) 36 of the print head 32 to help clear the die(s) 36. When the apparatus is idle (e.g., between build projects), the print head 32 may be positioned onto a sponge 97 within the sponge station 96, which remains wet with the cleaning solution via capillary action from the bath. The sponge 97 may be, in particular embodiments, a porous foam preferentially selected to be compatible with binder, cleaner, and/or print head (e.g., a polyurethane foam). Thus, the die(s) 36 of the print head 32 may remain unclogged for subsequent use. A pattern test station 98 may be adjacent to the cleaning system 58 to allow for test printing through the print head 32 to ensure that each of the dies 36 are unclogged and in good working order prior to each print project.

Referring again to FIGS. 1-4, an inner wall 90 may extend from the carry plate 22 between the print system 12 and the cure system/recoat system (14/16) to help isolate the independent operations. Thus, the cleaning operation of the print head 32 over the cleaning system 58 may be separated from the environment over the job box 18 while the recoat system 16 is transferring powder 44 from the supply box 54 to the job box 18.

Figure 1:
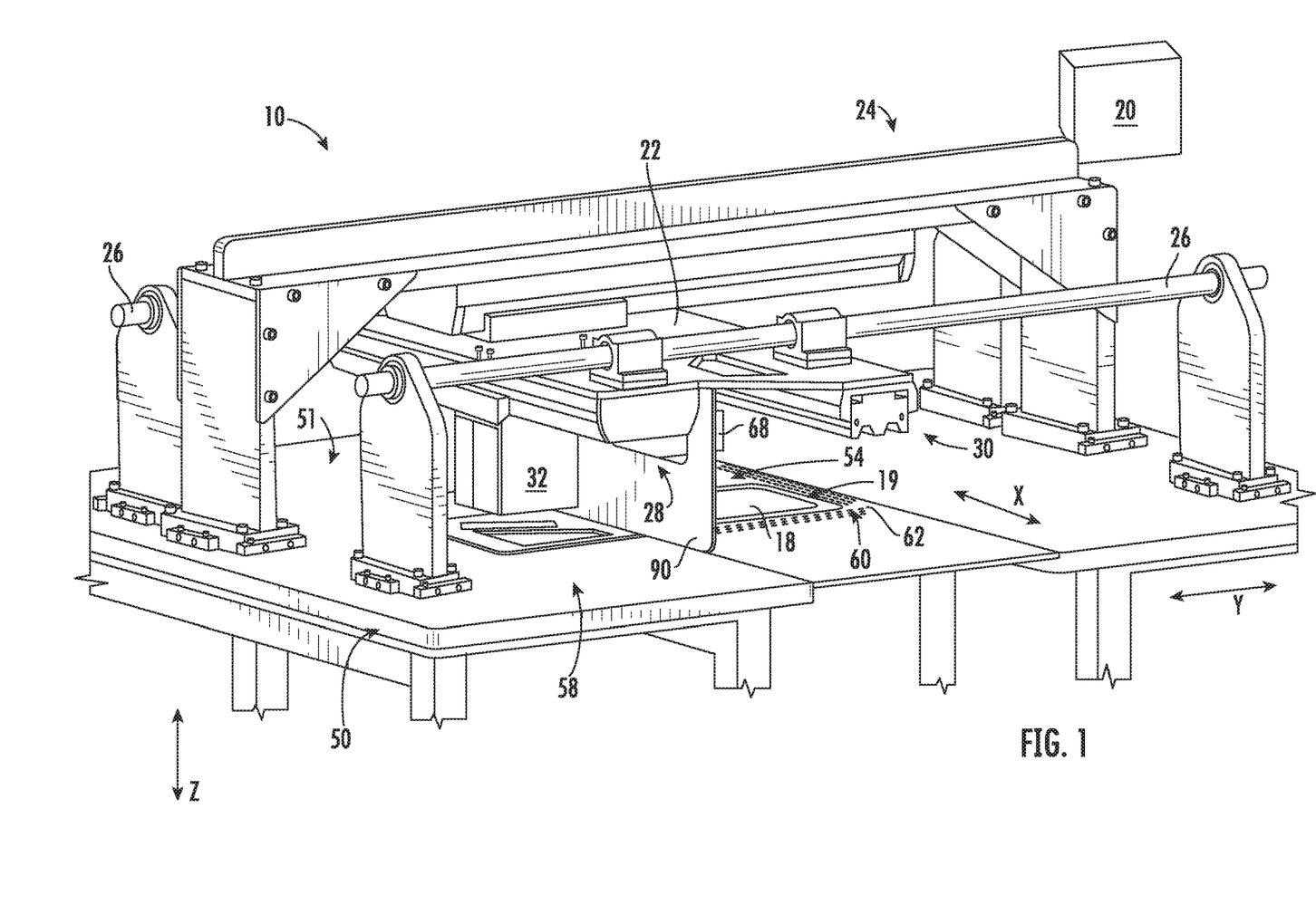
FIG. 1 shows a perspective view of an exemplary binder jet printing apparatus according to one embodiment of the present disclosure.
Figure 2:
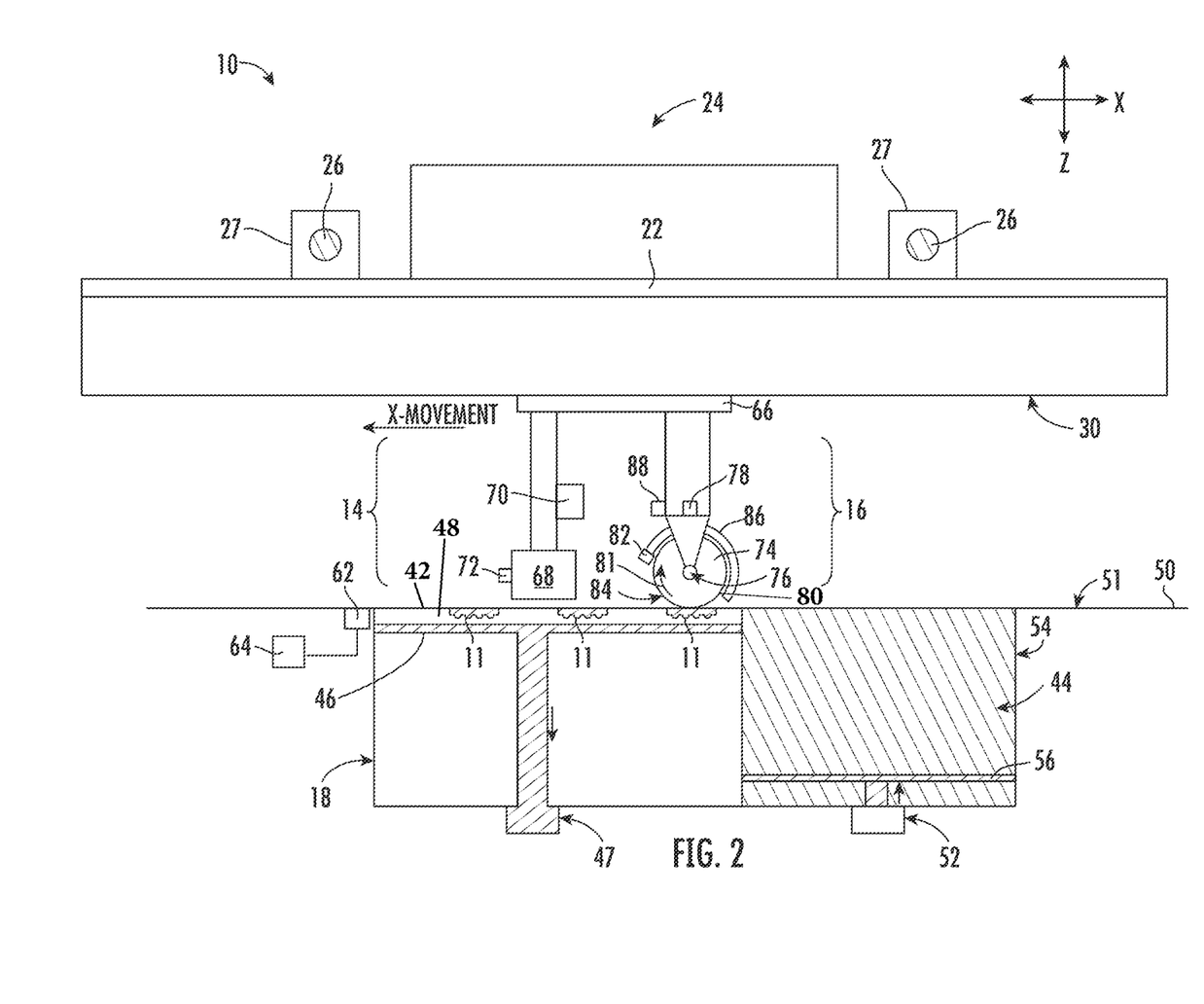
FIG. 2 shows side view of one aspect of an exemplary binder jet printing apparatus according to one embodiment of the present disclosure.
Figure 3:
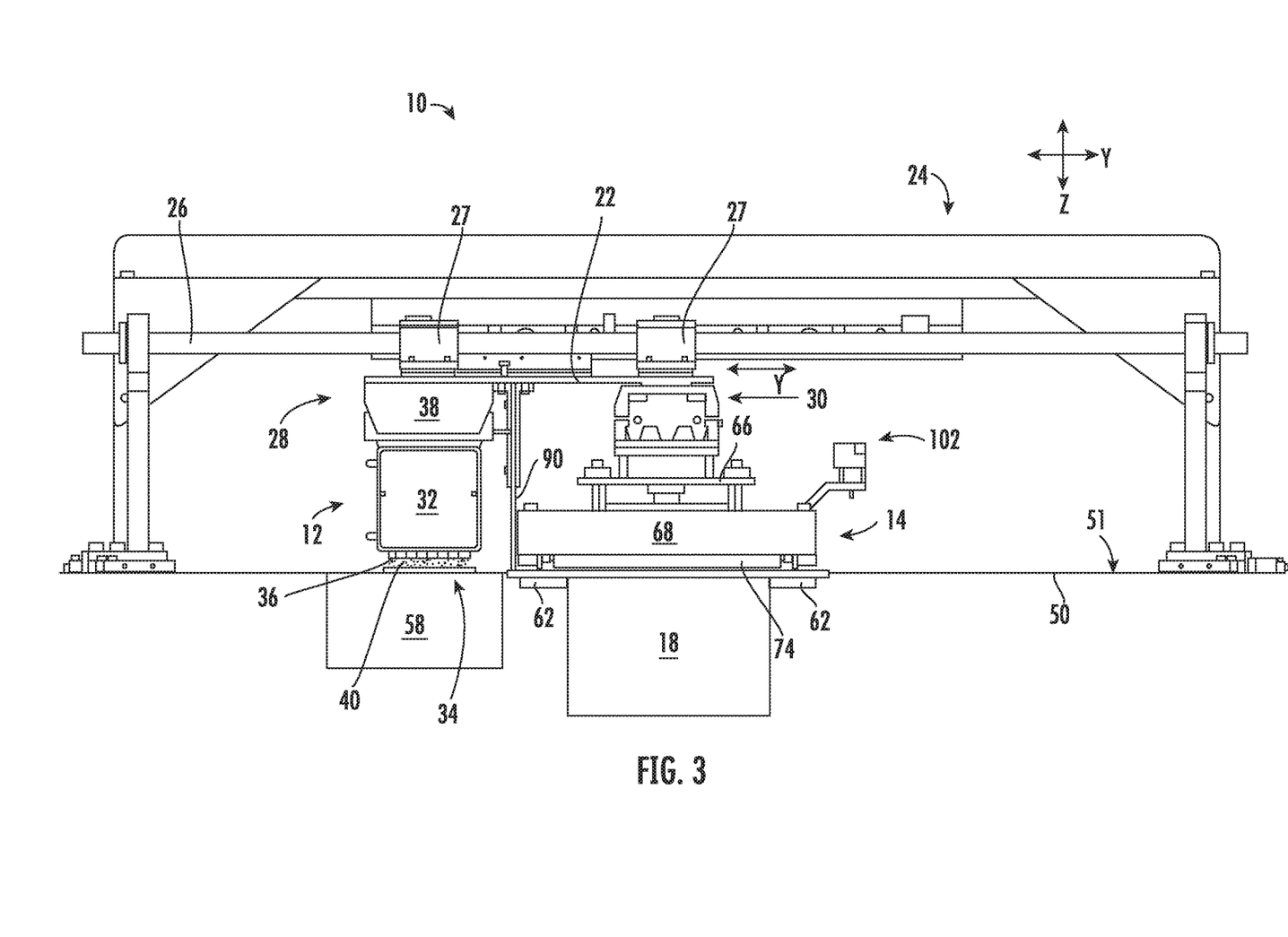
FIG. 3 shows a front view of an exemplary binder jet printing apparatus according to one embodiment of the present disclosure.
Figure 4:
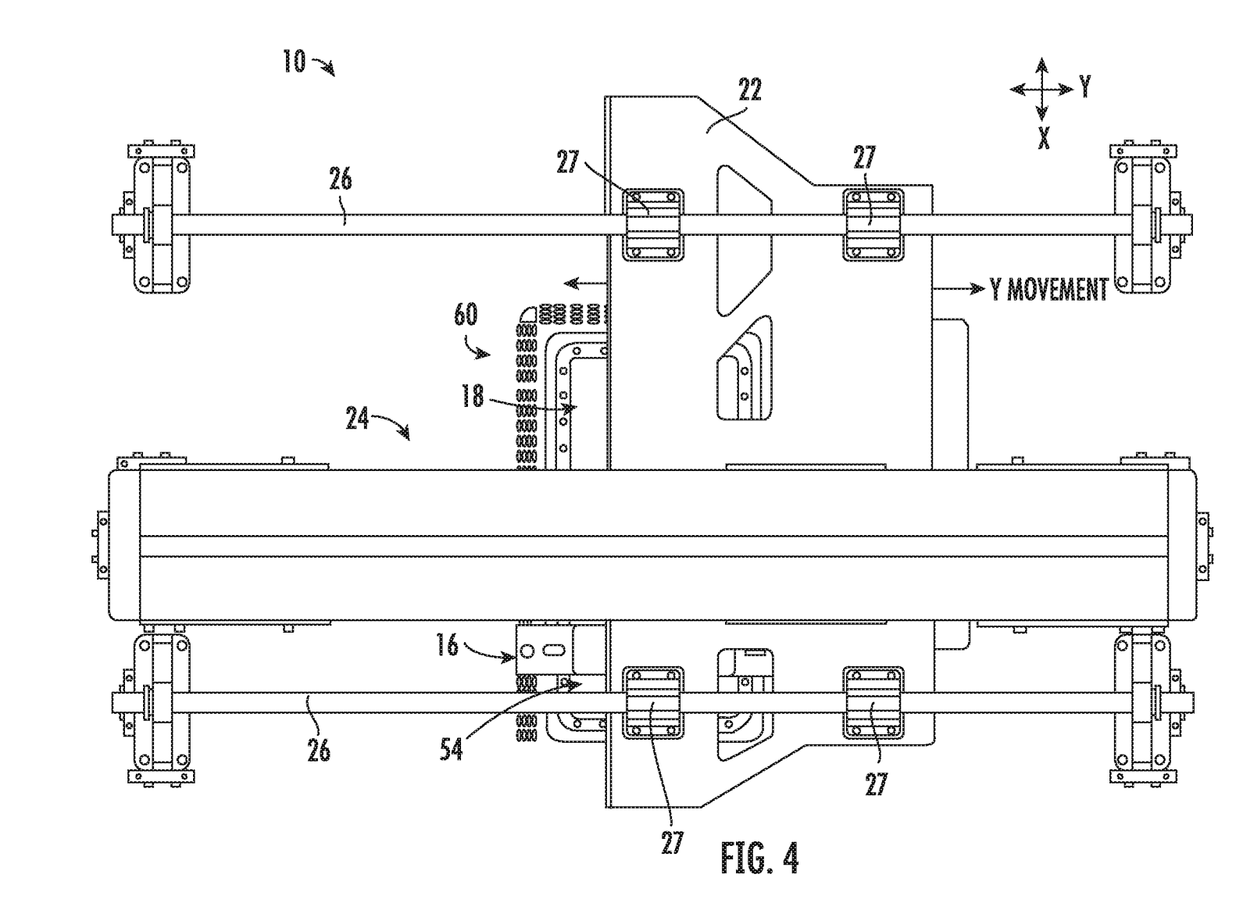
FIG. 4 shows top view of one aspect of an exemplary binder jet printing apparatus according to one embodiment of the present disclosure.

Referring to FIG. 3, an optional positioning system 102 may be utilized to help control the movement of the first movement system 24, a second movement system 28, and a third movement system 30. When present, the positioning system 102 may be in communication with the control system 20.

Figure 7:
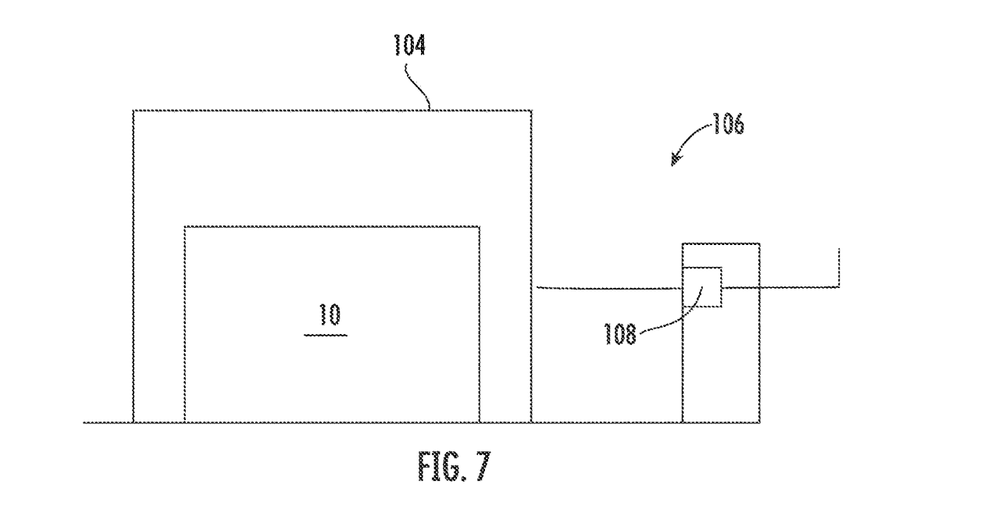
FIG. 7 shows the apparatus, such as in FIGS. 1-4, in a housing with an environmental system.

In the embodiment shown in FIG. 7, the apparatus 10 may be encased within a housing 104. For example, the housing 104 may encapsulate the job box 18, the print system 12, the cure system 14, the recoat system 16, the cleaning system 58, and optionally other components of the apparatus 10 in order to facilitate control of the build environment. The housing 104 may help with powder containment within the apparatus 10. In one particular embodiment, an environmental system 106 is utilized in conjunction with the housing 104. The environmental system 106 may include a filter system 108 configured to collect aerosolized powder particles within the apparatus 10, as well as to extract fumes and other volatile species created during the build process.

The output of the apparatus 10 shown in FIGS. 1-4 may be a green part formed of the build powder with the cured binder material that retains the portion in the green shape produced. The build powder may be any suitable powder (e.g., metal, metal alloy, ceramic, and so forth, as well as combinations thereof). The binder may be any suitable liquid binder.

Upon completion of the green part, post processing steps may be performed to transform the green part into the finished part. Post processing steps may include, but are not limited to, cleaning, heat treatment (e.g., to drive away binder from the green part), infiltration, etc. For example, heat treatment may also include solid-state sintering of the powder after binder removal as well as hot isostatic pressing (HIP) to get to full density monolithic parts.

Figure 5:
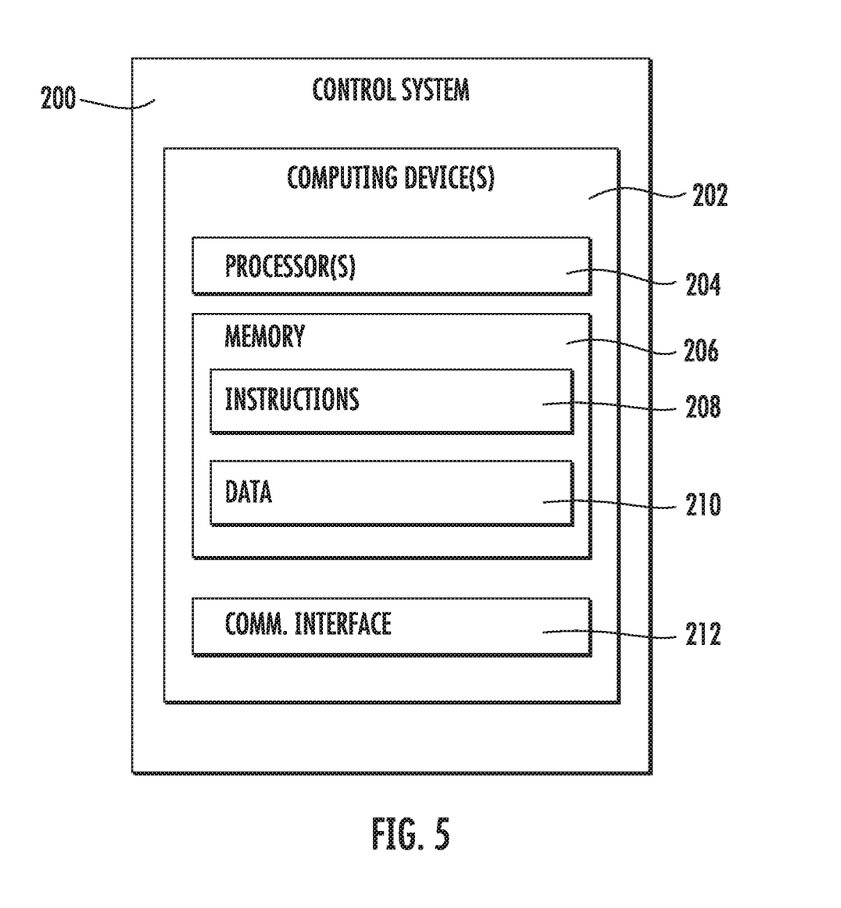
FIG. 5 shows an exemplary control system for use with the system and process for building an object according to one embodiment of the present disclosure (e.g., using a binder jet printing apparatus)

FIG. 5 depicts a block diagram of an exemplary control system 200 that can be used to implement methods and systems according to example embodiments of the present disclosure, such as the control system 20, the controller 70, the controller 78, etc. In particular, the control system 200 may control one or more of the first movement system 24, the second movement system 28, the third movement system 30, the positioning system 102, the cure system 14, the recoat system 16, the print system 12, the cleaning system 58, the actuation system 47 for the job box 18, the actuation system 52 for the supply box 54, the drain system 60, operation of the lamp 68, operation of the roller 74, etc.

As shown, the control system 200 may include one or more computing device(s) 202, which may operate independently from each other or in communication with each other (e.g., wired communication, wireless communication, etc.). The one or more computing device(s) 202 can include one or more processor(s) 204 and one or more memory device(s) 206. The one or more processor(s) 204 can include any suitable processing device, such as a microprocessor, microcontroller, integrated circuit, logic device, or other suitable processing device. The one or more memory device(s) 206 can include one or more computer-readable media, including, but not limited to, non-transitory computer-readable media, RAM, ROM, hard drives, flash drives, or other memory devices. Control parameters may also come from a network, including but not limited to server-operated controllers (i.e., cloud), such that the apparatus may be operated remotely.

The one or more memory device(s) 206 can store information accessible by the one or more processor(s) 204, including computer-readable instructions 208 that can be executed by the one or more processor(s) 204. The instructions 208 can be any set of instructions 208 that when executed by the one or more processor(s) 204, cause the one or more processor(s) 204 to perform operations. The instructions 208 can be software written in any suitable programming language or can be implemented in hardware. In some embodiments, the instructions 208 can be executed by the one or more processor(s) 204 to cause the one or more processor(s) 204 to perform operations, such as the operations for the first movement system 24, the second movement system 28, the third movement system 30, the positioning system 102, the cure system 14, the recoat system 16, the print system 12, the cleaning system 58, the actuation system 47 for the job box 18, the actuation system 52 for the supply box 54, the drain system 60, the lamp 68, the roller 74, etc., shown in FIGS. 1-4.

The memory device(s) 206 can further store data 210 that can be accessed by the one or more processor(s) 204. For example, the data 210 can include any data used for a build process, such as a CAD model as described herein. The data 210 can include one or more table(s), function(s), algorithm(s), model(s), equation(s), etc. for stabilizing input according to example embodiments of the present disclosure. The one or more computing device(s) 202 can also include a communication interface 212 used to communicate, for example, with the other components of the apparatus 10. The communication interface 212 can include any suitable components for interfacing with one or more network(s), including for example, transmitters, receivers, ports, controllers, antennas, or other suitable components.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A binder jet printing apparatus, comprising:
   a job box having a build plate therein, wherein the build plate is actuatable within the job box;
   a supply box having a bottom platform that is actuatable within the supply box;
   a print system including at least one print head connected to a binder source, wherein the print system is configured to apply a pattern of binder onto an exposed powder layer over the build plate of the job box;
   a recoat system including a recoater, wherein the recoater is configured to move from the supply box to the job box to transfer powder from the supply box to the job box so as to form a powder layer over the build plate of the job box; and
   a cure system configured to direct electromagnetic radiation onto the job box;
   wherein the print system and the recoat system are attached to a carry plate of the binder jet printing apparatus, the carry plate configured for movement along a first direction,
   wherein the cure system and the recoat system are attached to a gang plate of the binder jet printing apparatus, the gang plate configured for movement along a second direction, independent from the print system, between the job box and the supply box, the second direction orthogonal to the first direction, the gang plate being vertically spaced from the carry plate, and
   wherein the print system is configured for movement in the second direction, independent from the gang plate, between stations of a cleaning system.

2. The binder jet printing apparatus of claim 1, wherein the build plate within the job box and the bottom platform within the supply box are actuatable in a shared relationship.

3. The binder jet printing apparatus of claim 1, wherein the job box and the supply box have a substantially equal size in their respective x-y plane to have an equal volume per unit of depth in their respective z-direction, and wherein the bottom platform raises in the z-direction within the supply box for a first distance that is equal to or greater than a second distance that the build plate lowers within the job box to ensure that powder is available to form the powder layer over the job box.

4. The binder jet printing apparatus of claim 1, wherein the cure system and the recoat system are positioned relative to each other such that, when passing from the supply box to the job box, the recoat system trails the cure system such that the binder on the exposed powder layer over the job box is cured prior to transfer of the powder from the supply box to the job box.

5. The binder jet printing apparatus of claim 1, wherein the recoat system comprises a roller rotatable about an axis in a rotational direction that is counter-rotating to a direction of movement of the cure system from the supply box to the job box.

6. The binder jet printing apparatus of claim 5, further comprising:
   a controller in communication with the roller and configured to regulate a rotational speed of the roller.

7. The binder jet printing apparatus of claim 5, wherein the roller is composed of a stainless steel with an external coating thereon, wherein the external coating increases a hardness of the roller.

8. The binder jet printing apparatus of claim 7, further comprising:
   a shield partially encasing the roller therein for powder containment.

9. The binder jet printing apparatus of claim 7, further comprising:
   a vacuum manifold positioned adjacent to the roller to pick up aerosolized powder particles during a recoating process.

10. The binder jet printing apparatus of claim 1, wherein the print system is configured to move over the job box independently of the movement of the cure system and the recoat system.

11. The binder jet printing apparatus of claim 1, further comprising:
a drain system comprising a drain positioned along at least one side of the job box to collect excess powder from the job box.

12. The binder jet printing apparatus of claim 1, further comprising:
an inner wall extending in a machine direction and positioned so as to separate the print system from the cure system and the recoat system.

13. The binder jet printing apparatus of claim 1, wherein:
the cleaning system is positioned such that a print head of the print system is cleaned simultaneously while the cure system and the recoat system are operating over the job box.

14. The binder jet printing apparatus of claim 1, wherein the cure system is attached to the carry plate of the binder jet printing apparatus.

15. The binder jet printing apparatus of claim 1, wherein the print system is mechanically separated from the cure system and/or the recoat system.

16. The binder jet printing apparatus of claim 1, wherein the print system is mechanically separated via a wall from the cure system.

17. The binder jet printing apparatus of claim 1, wherein the print system is mechanically separated via a wall from the recoat system.

18. A binder jet printing apparatus, comprising:
a job box having a build plate therein, wherein the build plate is actuatable within the job box;
a supply box having a bottom platform that is actuatable within the supply box;
a print system including at least one print head connected to a binder source, wherein the print system is configured to apply a pattern of binder onto an exposed powder layer over the build plate of the job box;
a recoat system including a recoater, wherein the recoater is configured to move from the supply box to the job box to transfer powder from the supply box to the job box so as to form a powder layer over the build plate of the job box; and
a cure system configured to direct electromagnetic radiation onto the job box;
wherein the print system, the cure system, and the recoat system are attached to a carry plate of the binder jet printing apparatus, the carry plate configured to move the print system, the cure system, and the recoat system in unison along a first direction, and
wherein the cure system and the recoat system are attached to a gang plate of the binder jet printing apparatus, the gang plate configured to move the cure system and the recoat system in unison in a second direction, independent from the print system, between the job box and the supply box, wherein the second direction is orthogonal to the first direction, and
wherein the print system is configured for movement in the second direction, independent from the gang plate, between stations of a cleaning system.

* * * * *